Jan. 7, 1958 E. S. TELTSCHER 2,819,399

SIGNAL AMPLITUDE LIMITING CIRCUIT

Filed Feb. 21, 1957

*INVENTOR.*
ERWIN S. TELTSCHER
*BY*
Harry M. Saragovitz
ATTORNEY

United States Patent Office 2,819,399

Patented Jan. 7, 1958

2,819,399

SIGNAL AMPLITUDE LIMITING CIRCUIT

Erwin S. Teltscher, Forest Hills, N. Y., assignor to the United States of America as represented by the Secretary of the Army Application February 21, 1957, Serial No. 641,771

5 Claims. (Cl. 250—27)

Figure 1:
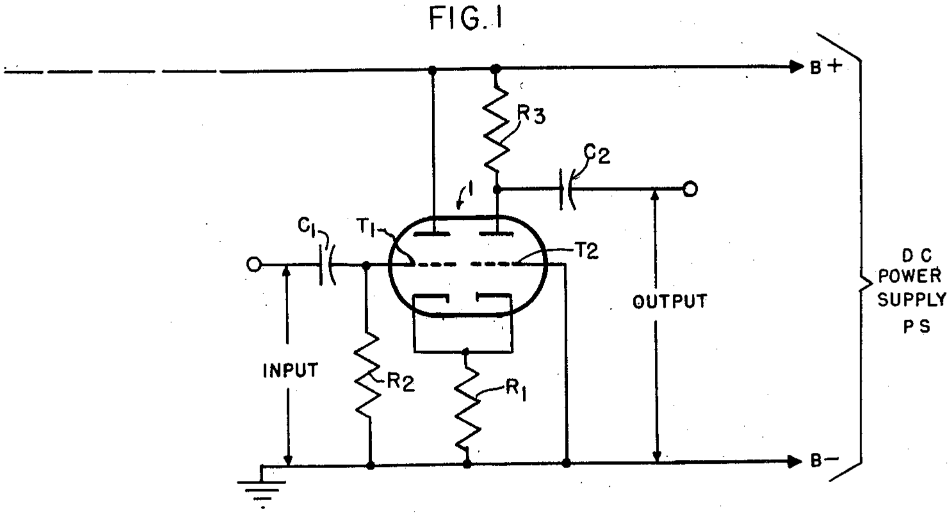

The invention relates to signal amplitude limiting circuits and particularly to such a circuit for use in a radio or other signal communication system to limit the amplitude of a signal-modulated carrier wave.

It is especially applicable to, although not limited to, a limiter circuit for use in the receiver of a radio system, for example, a frequency shift carrier telegraph system or a frequency modulation carrier telephone system, to suppress the amplitude variations of a frequency-modulated carrier signal caused by circuit noise or other interference in the system. One limiter circuit which has been used for this purpose in the prior art, sometimes referred to as a Crossley limiter, is a limiting amplifier comprising two cathode-coupled triode electron tube stages, adapted for limiting both the negative and positive amplitude peaks of a frequency modulated carrier wave applied to the first triode stage. However, such a limiter circuit will not in itself prevent variation of the limiter output with fluctuations in the line supply voltages for the electron tubes in the radio system. This defect may be remedied to some extent by the use of a conventional voltage stabilizer connected across the anode voltage supply source, but since the limiter circuit is usually only one of a chain of electron tube circuits in a radio system, and filament voltages as well as plate energizing voltages may vary in each of the circuits in the chain, it has been found that this expedient will not sufficiently stabilize the total output voltage of the chain of circuits.

An object of the invention is to improve such limiter circuits from the standpoint of maintaining its total output voltage substantially constant for variations in the input voltage thereto.

A related object is to prevent transitory variations in the voltage supply for the electron tubes in a signal amplitude limiter circuit and the circuits feeding that circuit from appreciably affecting the total output voltage of the limiter circuit.

A more specific object is to improve the action in a signal amplitude limiter circuit so as to provide the desired amplitude limitation of an applied signal modulated carrier wave and simultaneously to compensate for the effects of transient variations in the voltage supplies for the electron tubes in the limiter and associated circuits on the total output voltage of the limiter circuit.

These objects are attained in accordance with the invention by the provision of auxiliary means in a signal amplitude limiting circuit for causing the output voltage thereof to decrease automatically as the voltage input to that circuit increases, and vice versa, at a rate such that the total output voltage will be maintained substantially constant at all times. In one embodiment, this is accomplished mainly by modification of the above-described conventional limiter circuit to substitute a pentode electron discharge device for the triode in the second amplifier stage; using a stabilized voltage supply for the anode and screen grid electrodes of the pentode; and connecting the suppressor grid of the pentode to a selected intermediate point in a bleeder chain of resistances connected across the unstabilized plate voltage supply for the triode in the first amplifier stage.

Figure 2:
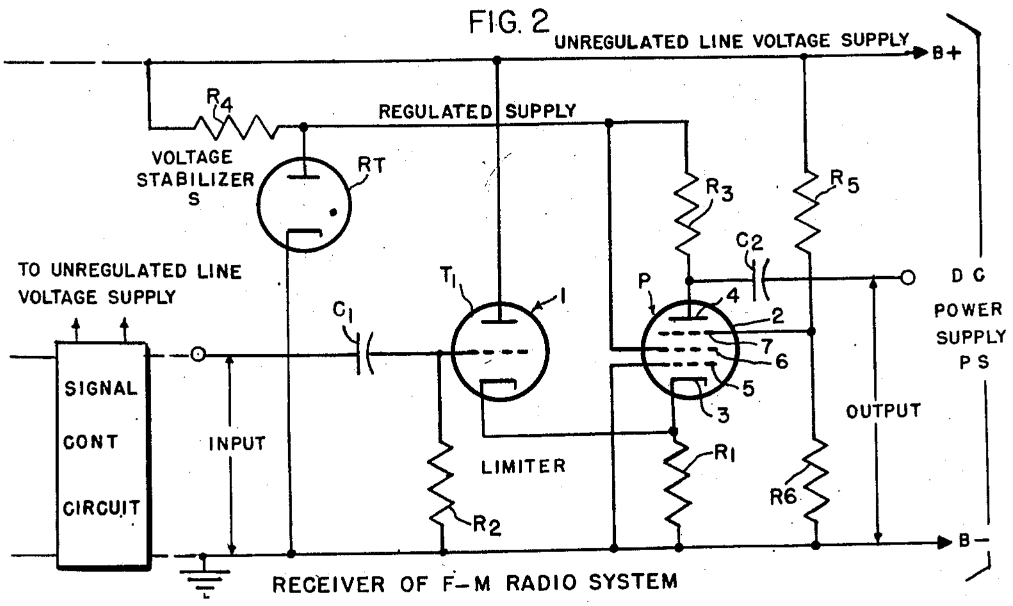

The various objects and features of the invention will be better understood from the following detailed description thereof when it is read in conjunction with the accompanying drawing in which:

Figure 1 shows schematically a conventional limiter circuit adapted for limiting both the negative and positive amplitude peaks of an applied signal-modulated carrier wave; and Figure 2 shows schematically a portion of the receiving circuit of a radio system including a modification of the limiter circuit of Figure 1, embodying the invention.

The conventional limiter circuit of Figure 1 includes a pair of cathode-coupled triode sections or electron discharge devices $T_1$ and $T_2$ respectively forming the first and second stages of a limiting amplifier. Each of the triode sections $T_1$ and $T_2$ includes the usual cathode, anode and control grid electrodes as shown. The two triode sections $T_1$ and $T_2$ may be inclosed in a single evacuated envelope 1 as shown, or may be inclosed in separate envelopes. The two cathodes of these tubes, energized from any suitable source (not shown), are connected to ground and to the negative terminal B— of the direct current anode voltage supply portion of the unregulated line voltage source PS through a common cathode resistor $R_1$ which provides the cathode coupling between the two triode sections. The grid-cathode circuit of the first triode section $T_1$ may include in addition to the common cathode resistor $R_1$ a second resistor $R_2$ in series therewith, and the grid-cathode circuit of the second triode section $T_2$ includes only the common cathode resistor $R_1$. The anode of the first triode section $T_1$ is connected directly to the positive terminal B+ of the anode voltage supply source, and the anode of the second triode section $T_2$ is connected to the same positive terminal B+ of that source through an individual series resistor $R_3$ which is of small value so as to make the gain of triode section $T_2$ low. The "Input" terminals of the limiter circuit are connected through the series capacitor $C_1$ across the resistor $R_2$ in the grid-cathode circuit of the first triode section $T_1$, and the "Output" terminals of the limiter circuit are connected through the series capacitor $C_2$ and the common cathode resistor $R_1$ across the anode and cathode of the second triode section $T_2$.

The limiter circuit of Figure 1 operates as a transient-free limiter in which the first triode section $T_1$ limits each negative amplitude peak of the signal-modulated carrier wave applied to the grid-cathode circuit of that section through the series capacitor $C_1$ and the shunt resistor $R_2$, and the second triode section $T_2$, cathode coupled to the first triode section $T_1$ limits each positive amplitude peak of the applied wave. As the effect of small negative potentials on the grid of triode section $T_1$ is to cut off that section, it is seen that the voltage produced across the coupling resistor $R_1$ due to current in $T_1$ is zero during most of each negative half-cycle of the applied signal-modulated wave. As the potential on the grid of $T_1$ swings positive with respect to ground under control of the applied wave, the current drawn by $T_1$ will increase causing the voltage across the resistor $R_1$ to increase. The value of resistor $R_1$ is made sufficiently large so that at no time will the grid voltage exceed the cathode voltage. Thus, the grid of $T_1$ never goes positive with respect to the grid of that triode section, and no grid current will flow. Therefore, no time constant effect involving the capacitor $C_1$ and resistor $R_2$ will exist, and the limiting action of the circuit will be substantially instantaneous and transient free.

As the voltage across $R_1$ increases due to the positive swing of the potential on the grid of $T_1$, the second normally operative triode section $T_2$ is driven to cut-off. By proper selection of circuit constants $T_2$ is made to cut off at about the same positive swing of the potential on the grid of $T_1$ as does the first triode section $T_1$ for negative swings of the potential on its own grid. Therefore, the action of the limiter is symmetrical about the zero axis so as to provide limitation of the same amount for the positive and negative peaks of the applied wave, and is both transientless and instantaneous for any abrupt level or frequency change.

The modified limiter circuit in accordance with the invention in the radio receiving circuit shown in Figure 2 differs from the conventional limiter circuit of Figure 1 in the following respects: The second triode section $T_2$ within the envelope 1 is eliminated and a pentode electron discharge device B, which may be a 12AU6 tube, having a cathode 3, an anode 4, a cathode grid 5, a screen grid 6 and a suppressor grid 7 within a separate evacuated envelope 2, is substituted therefor to provide the second stage of the limiting amplifier.

A conventional voltage stabilizing circuit S comprising a gaseous diode regulator tube RT (which may be, for example, a standard VR 105–30 or VR 150–30 regulator tube), and a limiting resistor $R_4$ of properly selector value in series therewith, is connected across the B+ and B— terminals of the anode voltage supply portion of the unregulated power supply source PS to provide a stabilized (regulated) voltage supply for energizing the anode and screen grid electrodes of the pentode P. The cathode 3 and anode 4 of the pentode P are connected through the common cathode resistor $R_1$ for the cathodes of the triode $T_1$ and the pentode P, and the series plate resistor $R_3$ for the pentode P across the terminals of the regulating tube RT in the voltage stabilizer circuit S. The control grid-cathode circuit of the pentode P, like that of the second triode section $T_2$ in the circuit of Figure 1, includes only the common cathode resistor $R_1$ which acts to provide cathode coupling between the second stage pentode P and the first stage triode $T_1$ in the limiting amplifier. The screen grid 6 of pentode P is connected directly to a point between the plate resistor $R_3$ of the pentode P and a point between the regulating tube RT and the limiting resistor $R_4$ in the stabilizing circuit S.

The load current through the pentode P and the current that flows in the gaseous regulating tube RT both pass through the series limiting resistor $R_4$. If the supply voltage from the voltage supply source PS drops, the voltage across the regulator tube RT also tends to drop. Instead, the gas in the tube RT de-ionizes slightly and less current passes through this tube. The current in the limiting resistor $R_4$ is decreased by the amount of this current decrease in the regulator tube. Since the current through resistor $R_4$ is less, the voltage drop across $R_4$ is less. By making the resistor $R_4$ of the proper value relative to the load (provided by the pentode P connected across the tube RT) and to the particular regulator tube used for RT, the voltage across that load is held constant.

The modified limiter circuit of Figure 2 also includes a bleeder chain comprising the two resistors $R_5$ and $R_6$ in series, connected across the B+ and B— terminals of the unstabilized power source PS, utilized for energizing the anode electrode of the first triode section $T_1$. The suppressor grid 7 of the pentode P is connected to a point intermediate the two resistors $R_5$ and $R_6$ in this bleeder chain so that its potential varies directly with the voltage variations in this unregulated source.

The action of the limiter circuit of Figure 2 in response to transient variations in line voltage may be explained as follows:

While the voltages on all grids of the pentode P except for the suppressor grid 7 rise (or fall) at a slow rate, those on the suppressor grid 7 of the pentode, because of its connection to the unregulated plate voltage source PS as above described, rise (or fall) at a faster rate.

Now, an increasing positive voltage on the suppressor grid 7 of the pentode P (all other voltages remaining constant) will cause a decreasing output voltage from the limiter circuit. This is exactly what happens when the H-T and filament voltages for the limiter circuit and the electron tube circuits feeding that circuit are varied, and a decreasing voltage output for the limiter ensues with increasing filament and plate voltage supplies. By properly adjusting the relative values of the resistors $R_5$ and $R_6$ on opposite sides of the intermediate point in the bleeder chain to which the suppressor grid 7 of the pentode P is connected, the rate of decrease or increase of the total voltage output of the limiter circuit with increasing or decreasing line voltage, respectively, can be made such that the total output voltage is maintained constant for such variations.

The limiter circuit of Figure 2 has been tested using different 12AU6 pentodes in the second stage of the amplifier with substantially identical results as regards prevention of variations of limiter output voltage with variations in line voltage. This circuit will provide better results from the standpoint of amplitude peak limitation and preventing variations of output voltage with line voltage variations of the signal-modulated wave applied to the grid circuit of the first stage triode is a square wave.

A pentode instead of a triode may be employed in the first stage of the limiter circuit. Also any other of the known types of voltage stabilizers may be used in place of the one illustrated. Various other modifications of the arrangements illustrated and described which are within the spirit and scope of the invention will occur to persons skilled in the art.

What is claimed is:

1. In a signal transmission system including a source of signal-modulated carrier energy: at least one signal control circuit employing electron discharge devices, including a signal amplitude limiter, said limiter comprising a first electron discharge device having electrodes including a cathode, an anode and a control grid, and circuits interconnecting these electrodes; a pentode electron discharge device having a cathode, an anode, a control grid, a screen grid and a suppressor grid, and circuits interconnecting these electrodes; a common cathode resistor for said first device and said pentode, providing coupling therebetween; a line voltage power supply for the electron discharge devices in the signal control circuits, including an unstabilized direct current voltage source for energizing the anode of said first device in said limiter and a stabilized direct current voltage source for energizing the anode and screen grid of said pentode device; an input circuit for impressing single-modulated carrier energy from the first mentioned source on the control grid-cathode circuit of said first device; an output circuit for the limited modulated carrier energy produced by said limiter, connected across the anode-cathode circuit of said pentode device; and means for reducing variations of the output voltage in said output circuit due to transient variations in the voltage of said line voltage power supply comprising means for energizing the suppressor grid of said pentode device from said unstabilized voltage source.

2. The system of claim 1, in which a bleeder chain of resistances is connected across said unstabilized voltage source and said suppressor grid of said pentode device is energized therefrom by its connection to an intermediate voltage point in said bleeder chain.

3. The system of claim 1, in which a bleeder chain of resistances is connected across said unstabilized voltage source, said suppressor grid of said pentode device is connected to an intermediate point in said bleeder chain selected to make the ratio of the resistance on opposite sides of said intermediate point such that the output voltage of said limiter is maintained substantially constant with said transient variations in the voltage of said line voltage power supply.

4. The system of claim 1, in which said limiter circuit includes a voltage stabilizer consisting of a gaseous regulating diode having a plate and a cathode, and a limiting resistor of properly selected value in series therewith, and said stabilized voltage source for energizing the anode and screen grid of said pentode device is derived from said unstabilized voltage source by the connection of said voltage stabilizer across the latter source, the connection of the anode and cathode of said pentode device across the terminals of the regulating diode in said voltage stabilizer and the connection of the screen grid of said pentode to a point in the circuit connecting the anode of the regulating diode to the anode of said pentode device.

5. A limiter for use in the receiver of a radio system to suppress the amplitude variations of a received frequency-modulated carrier signal caused by circuit noise or other interference in the system; said limiter including a first electron discharge amplifying device having electrodes including a cathode, an anode and a control grid, and circuits interconnecting these electrodes, a pentode electron discharge device having a cathode, an anode, a control grid, a screen grid and a suppressor grid, and circuits interconnecting these electrodes, a common cathode resistor for said first device and said pentode device, providing coupling between these devices, an input circuit for impressing said frequency-modulated carrier signal on the control grid-cathode circuit of said first device and an output circuit for the limited frequency-modulated carrier signal, connected across the anode-cathode circuit of said pentode device; a line voltage power supply for said receiver, including an unstabilized direct current voltage source for energizing the anode of said first device and a stabilized voltage source derived from said unstabilized source, for energizing the anode and screen grid of said pentode device; a bleeder chain of resistances connected across said unstabilized voltage source; and a connection from the suppressor grid of said pentode device to an intermediate point in said bleeder chain, the ratio of the resistance on opposite sides of the intermediate point in said bleeder chain being selected to control the potential on said suppressor grid so that the total output voltage of said limiter is maintained substantially constant for transient variations in the voltage of said line voltage power supply.

References Cited in the file of this patent

UNITED STATES PATENTS

| | | |
|---|---|---|
| 2,517,863 | Froman | Aug. 8, 1950 |
| 2,766,332 | Henderson | Oct. 9, 1956 |

FOREIGN PATENTS

| | | |
|---|---|---|
| 893,135 | France | Jan. 17, 1944 |